(12) United States Patent
Nazari et al.

(10) Patent No.: US 10,417,202 B2
(45) Date of Patent: Sep. 17, 2019

(54) STORAGE SYSTEM DEDUPLICATION

(71) Applicant: HEWLETT PACKARD ENTERPRISE DEVELOPMENT LP, Houston, TX (US)

(72) Inventors: Siamak Nazari, Mountain View, CA (US); Jin Wang, Cupertino, CA (US); Srinivasa D. Murthy, Cupertino, CA (US); Roopesh Kumar Tamma, Fremont, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 83 days.

(21) Appl. No.: 15/387,603

(22) Filed: Dec. 21, 2016

(65) Prior Publication Data

US 2018/0173731 A1 Jun. 21, 2018

(51) Int. Cl.
*G06F 17/30* (2006.01)
*G06F 16/215* (2019.01)
(Continued)

(52) U.S. Cl.
CPC ............ *G06F 16/215* (2019.01); *G06F 3/067* (2013.01); *G06F 3/0608* (2013.01);
(Continued)

(58) Field of Classification Search
CPC ............. G06F 17/30303; G06F 3/0608; G06F 3/0641; G06F 3/067; G06F 17/3033;
(Continued)

(56) References Cited

U.S. PATENT DOCUMENTS 5,920,900 A 7/1999 Poole et al.
5,974,481 A 10/1999 Broder
(Continued)

FOREIGN PATENT DOCUMENTS

CN 102629258 A 8/2012
WO WO-0057275 A1 9/2000
(Continued)

OTHER PUBLICATIONS

Alvarez C., "Back to Basics: Deduplication," (Web Page), Net App, Tech OnTap Newsletter, Mar. 3, 2011, 7 pages, available at http://community.netapp.com/15/Tech-OnTap-Articles/Back-to-Basics-Deduplication/ta-p/84888.
(Continued)

*Primary Examiner* — Evan Aspinwall
(74) *Attorney, Agent, or Firm* — Hewlett Packard Enterprise Patent Department

(57) ABSTRACT

An example storage system may include storage media and a storage controller. The storage controller may be to establish virtual volumes, private data stores, and a deduplication data store, each being a virtual storage space of the storage media, wherein each of the private data stores is associated with one of the virtual volumes and the deduplication data store is shared among the virtual volumes. The storage controller may, in response to receiving input data that is to be stored in a given one of the virtual volumes, determine a signature for the input data and select between storing the input data in the private data store associated with the given one of the virtual volumes and storing the input data in the deduplication data store. The storage controller may select where to store the input data based on whether a metadata storage location addressed by a first portion of the signature includes valid metadata, and, if so: whether the metadata includes a back-pointer to one of the virtual volumes, and
(Continued)

whether a second portion of the signature matches a key included in the metadata.

18 Claims, 5 Drawing Sheets

(51) Int. Cl.
  *G06F 16/22* (2019.01)
  *G06F 16/23* (2019.01)
  *G06F 3/06* (2006.01)
(52) U.S. Cl.
  CPC ........ *G06F 3/0641* (2013.01); *G06F 16/2255* (2019.01); *G06F 16/2365* (2019.01)
(58) Field of Classification Search
  CPC ............. G06F 17/30371; G06F 16/215; G06F 16/2255; G06F 16/2365
  USPC ........................................................ 707/692
  See application file for complete search history.

(56) References Cited

U.S. PATENT DOCUMENTS

| | | | |
|---|---|---|---|
| 6,081,805 | A | 6/2000 | Guha |
| 6,226,710 | B1 | 5/2001 | Melchior |
| 7,366,836 | B1 | 4/2008 | Todd et al. |
| 7,412,580 | B1 | 8/2008 | Garthwaite |
| 7,640,406 | B1 | 12/2009 | Hagerstrom et al. |
| 7,827,218 | B1 | 11/2010 | Mittal |
| 7,979,670 | B2 | 7/2011 | Saliba et al. |
| 8,055,599 | B1 | 11/2011 | Werth |
| 8,086,799 | B2 | 12/2011 | Mondal et al. |
| 8,115,660 | B2 | 2/2012 | Kaufman et al. |
| 8,205,065 | B2 | 6/2012 | Matze |
| 8,224,874 | B2 | 7/2012 | Guo et al. |
| 8,312,066 | B2 | 11/2012 | Jagannathan et al. |
| 8,327,061 | B2 | 12/2012 | Boldy et al. |
| 8,356,020 | B2 | 1/2013 | Mittal |
| 8,392,376 | B2 | 3/2013 | Guo |
| 8,392,384 | B1 | 3/2013 | Wu et al. |
| 8,402,004 | B2 | 3/2013 | Provenzano et al. |
| 8,601,473 | B1 | 12/2013 | Aron et al. |
| 8,799,367 | B1 | 8/2014 | Condict et al. |
| 8,898,114 | B1 | 11/2014 | Feathergill et al. |
| 8,898,119 | B2 | 11/2014 | Sharma et al. |
| 8,943,023 | B2 | 1/2015 | Sorenson, III |
| 9,110,936 | B2 | 8/2015 | Li et al. |
| 9,152,500 | B1 | 10/2015 | Gardner |
| 2003/0033498 | A1 | 2/2003 | Borman et al. |
| 2006/0155915 | A1 | 7/2006 | Pereira |
| 2007/0089041 | A1 | 4/2007 | Wu |
| 2008/0228697 | A1 | 9/2008 | Adya et al. |
| 2009/0228511 | A1 | 9/2009 | Atkin et al. |
| 2009/0254507 | A1 | 10/2009 | Hosoya et al. |
| 2009/0259701 | A1 | 10/2009 | Wideman et al. |
| 2010/0070698 | A1 | 3/2010 | Ungureanu et al. |
| 2010/0174881 | A1 | 7/2010 | Anglin et al. |
| 2011/0055471 | A1 | 3/2011 | Thatcher et al. |
| 2011/0131390 | A1 | 6/2011 | Srinivasan et al. |
| 2011/0145207 | A1* | 6/2011 | Agrawal ........... G06F 17/30159 707/692 |
| 2011/0307447 | A1 | 12/2011 | Sabaa et al. |
| 2012/0089894 | A1 | 4/2012 | Winter |
| 2012/0166401 | A1 | 6/2012 | Li et al. |
| 2012/0215980 | A1 | 8/2012 | Auchmoody et al. |
| 2012/0226691 | A1 | 9/2012 | Edwards et al. |
| 2012/0246436 | A1 | 9/2012 | Wang et al. |
| 2013/0013865 | A1 | 1/2013 | Venkatesh et al. |
| 2013/0086006 | A1 | 4/2013 | Colgrove et al. |
| 2013/0086009 | A1 | 4/2013 | Li et al. |
| 2013/0117516 | A1 | 5/2013 | Sobolewski et al. |
| 2013/0198462 | A1 | 8/2013 | Serlet et al. |
| 2013/0268497 | A1 | 10/2013 | Baldwin et al. |
| 2013/0282676 | A1 | 10/2013 | Wade et al. |
| 2013/0346720 | A1 | 12/2013 | Colgrove et al. |
| 2014/0074804 | A1 | 3/2014 | Colgrove et al. |
| 2014/0310476 | A1* | 10/2014 | Kruus ................. G06F 12/0871 711/133 |
| 2015/0227757 | A1* | 8/2015 | Bestler ............... G06F 21/6227 713/167 |
| 2016/0070652 | A1* | 3/2016 | Sundararaman ...... G06F 3/0619 711/154 |
| 2017/0115883 | A1 | 4/2017 | Muppalaneni et al. |
| 2018/0032261 | A1* | 2/2018 | Singhai ................. G06F 3/0608 |

FOREIGN PATENT DOCUMENTS

| | | |
|---|---|---|
| WO | WO-2011084854 A1 | 7/2011 |
| WO | WO-2012173859 A2 | 12/2012 |
| WO | WO-2016068877 | 5/2015 |
| WO | WO-2015/178944 A1 | 11/2015 |
| WO | WO-2015167493 | 11/2015 |
| WO | WO-2015167493 A1 | 11/2015 |
| WO | WO-2016048331 | 3/2016 |
| WO | WO-2017/019079 | 2/2017 |

OTHER PUBLICATIONS

Black, D.L., "SBC-3—Thin Provisioning: Anchored," EMC Corporation, Mar. 10, 2010, T10/09-272r6, 16 pages.

Evans, M., "Information Technology—SCSI Black Commands—3 (SBC-3)," (Research Paper), Oct. 27, 2010, Working Draft Project American National Standard, T10/1799-D, 274 pages, available at http://www.13thmonkey.org/documentation/SCSI/sbc3r25.pdf.

Gilbert, D. "XCOPY and ODX in ddpt utility," (Research Paper), Dec. 27, 2014, 8 pages, available at http://sg.danny.cz/sg/ddpt_xcopy_odx.html.

Hewlett-Packard Development Company, L.P., "HP StoreOnce D2D: Understanding the Challenges Associated With NetApp's Deduplication," (Research Paper), Jan. 2011, Business white paper, 8 pages, available at https://www.mercurymagazines.com/pdf/NCHPINTELJMPDD1.pdf.

International Search Report & Written Opinion received in PCT Application No. PCT/US2014/036045, dated Jan. 26, 2015, 11 pages.

International Search Report & Written Opinion received in PCT Application No. PCT/US2014/057507, dated May 19, 2015, 13 pages.

International Search Report & Written Opinion received in PCT Application No. PCT/US2015/042831, dated Apr. 26, 2016, 13 pages.

International Search Report & Written Opinion received in PCT Application No. PCTUS2014/062622, dated Jul. 21, 2015, 13 pages.

Matt Kixmoeller, "Not Your Momma's Deduplication," Jan 12, 2012, Pure Storage Blog, (Web Page), <http://blog.purestorage.com/not-your-mommas-deduplication/>.

Osuna, A. et al,, "IBM Storage Data Deduplication Solutions," (Research Paper), First Edition, Redbooks, Feb. 1, 2011, 328 pages, available at https://www.e-techservices.com/redbooks/DataDeduplicationSolutions.pdf.

Saxena, M. et al, "FlashVM: Virtual Memory Management on Flash," (Research Paper), USENIX Annual Technical Conference, 2010, 14 pages, available at https://www.usenix.org/legacy/event/usenix10/tech/full_papers/Saxena.pdf.

Sliwa, C., "Primary Storage Deduplication Options Expanding," (Web Page), Jan. 2012, 8 pages, available at http://searchstorage.techtarget.com/tip/Primary-storage-deduplication-options-expanding.

Storage Networking Industry Association, "Hypervisor Storage Interfaces for Storage Optimization White Paper," (Research Paper), Copy Offload Hypervisor Storage Interfaces, Jun. 2010, 44 pages, available at http://www.snia.org/sites/default/files/HSI_Copy_Offload_WP-r12.pdf.

Symantec Corporation, "About Deduplication Fingerprinting," (Web Page), Jan. 17, 2011, 2 pages, available at http://www.symantec.com/business/support/index?page=content&id=HOWTO36304.

(56) References Cited

OTHER PUBLICATIONS

Symantec, "Veritas Storage Foundation™ from Symantec," (Research Paper), Data Sheet: Storage Management, 2011, 5 pages, available at http://www.federalnewsradio.com/pdfs/SYMANTECbveritasstoragefoundationDS21213907enus.pdf.

Weber, R., "XCOPYv2: Copy Offload with Extended Copy (Introduction)," (Research Paper), available Jan. 2011, T10/11-077r0.

Wikipedia, "Reference Counting," See lines 1-2, Nov. 14, 2012, 8 pages, available at http://web.archive.org/web/20121114161651/http://en.wikipedia.org/wiki/Reference_counting.

Extended European Search Report received in EP Application No. 17207601.0, dated May 24, 2018, 8 pages.

Adam Berrey, "Content-Addressable Distributed File System ("Keep")," Apr. 17, 2013, pp. 1-5, Available at: <arvados.org/projects/arvados/wiki/Keep>.

International Search Report and Written Opinion, International Application No. PCT/US2014/047596, dated Jan. 28, 2015, pp. 1-11, KIPO.

Partho Nath et al., "Evaluating the Usefulness of Content Addressable Storage for High-Performance Data Intensive Applications." Jun. 2008, pp. 1-10, ACM, Available at: <cse.psu.edu/~bhuvon/papers/ps/cas-hpdc08.pdf>.

Bonwick, J., "ZFS Deduplication," (Research Paper), Nov. 1, 2009, 21 pages, available at https://blogs.oracle.com/bonwick/entry/zfs_dedup.

Brown, N., "In-band Deduplication for Btrfs," (Research Paper), Mar. 9, 2016, 9 pages, available at https://lwn.net/Articles/679031/.

* cited by examiner

STORAGE SYSTEM DEDUPLICATION

BACKGROUND

Primary data storage systems may provide inline deduplication functionality. In general, the goal of such deduplication functionality is to reduce or eliminate occurrences in which identical chunks of data are stored multiple times in a storage system. To facilitate such deduplication, a storage system may calculate signatures for chunks of data, and may use these signatures to help determine whether a new data chunk is different from all of the already stored data chunks ("singleton data") or is the same as an already stored data chunk ("duplicate data").

DETAILED DESCRIPTION

Figure 1:
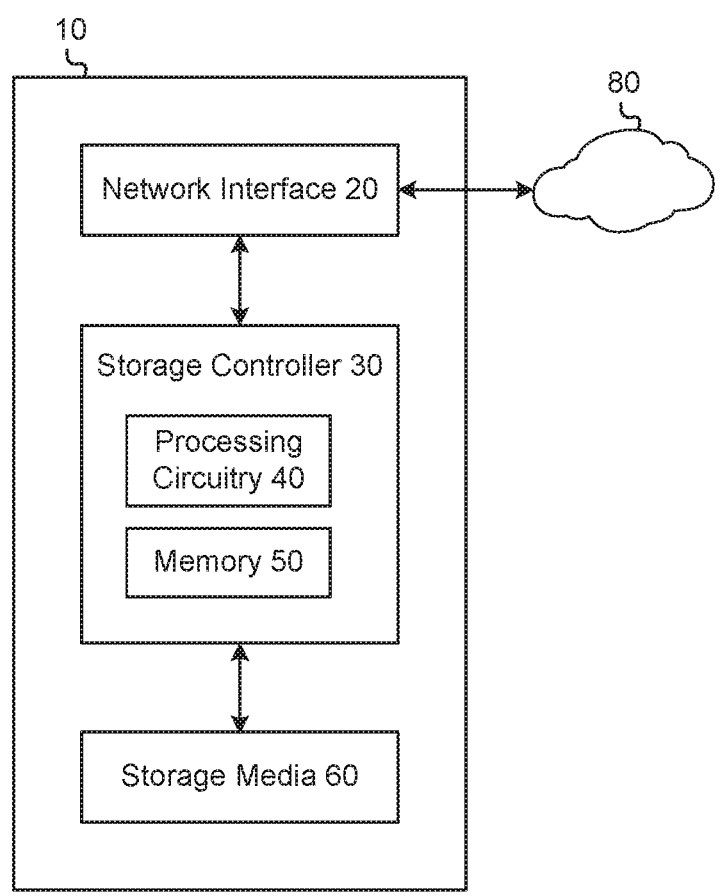
FIG. 1 illustrates an example storage system that has an example network interface, an example storage controller, and example storage media.

In examples described herein, separate data stores may be used for storing singleton data and duplicate data. In particular, singleton data may be stored in private data stores, with each virtual volume in the storage system having its own private data store to store its singleton data. Duplicate data, on the other hand, may be stored in a deduplication data store, which may be shared by all of the virtual volumes in the storage system. In this context, singleton data means data that is stored by just one of the virtual volumes in the storage system (i.e., no identical copy is stored in another of the virtual volumes), while duplicate data means data that has been (or is being) stored in multiple of the virtual volumes in the storage system.

When new data is received for storage in a virtual volume, the storage system may need to determine whether the data should be stored in the deduplication data store or in the private data store associated with the virtual volume. To help in determining whether a received data chunk is duplicate data, example storage systems disclosed herein may use metadata entries in the deduplication data store. For example, a first portion (e.g., the first 32 bits) of a signature of each data chunk may be used to address a metadata storage location in the deduplication data store. Specifically, when a chunk of data is received for storage, example storage systems may determine the signature for the data chunk and then may read the storage location in the deduplication data store that is addressed by a first portion of the signature. The storage system may then determine where to store the data chunk based on what (if anything) is stored in the metadata storage location.

If there is no valid metadata at the location, then the system may determine that this is the first time the data chunk has been encountered, and therefore the data chunk is singleton data and may be stored in a private data store. In such instances, example storage systems may then write a hint into the metadata storage location in the deduplication data store, where the hint includes a back-pointer to the virtual volume that received the data chunk. In such scenarios, the example systems may be able to determine that the new data chunk is singleton data simply by reading a single metadata storage location, which is very efficient.

If, on the other hand, the location already stores valid metadata, this indicates that a previously encountered data chunk has the same first portion of its signature as the new data chunk. This may be referred to herein for convenience as a "collision." Such a collision implies that the previously stored data and the new data could be the same (since the first portions of their signatures are the same). However, because it is possible for two different data chunks to have the same first portions of their signatures, it is not certain at this stage that the two data chunks are the same. Thus, when there is a collision, in order to determine whether to store the new data chunk in the deduplication data store or in a private data store, the storage system may still need to do some additional processing to determine whether the new data chunk and the previously stored data chunk are in fact the same.

In one approach to handling a collision (hereinafter a "first approach"), the storage system may determine if the data chunks are the same by reading the previously stored data and comparing it, bit-by-bit, to the new data. However, such data chunk comparisons may take significant time and processing resources.

Thus examples described herein may take a different approach to handling collisions (hereinafter a "second approach"). In particular, under the second approach each entry in the metadata storage locations of the deduplication data store may include a second portion (e.g., the 64 bits following the first portion) of the signature of the corresponding data chunk. Furthermore, when there is a collision, the storage system may compare the second portion of the signature of the new data chunk to the second portion that is stored in the entry, and may determine where the data chunk should be stored based (at least in part) on this comparison.

If the two second portions are different, then the storage system may determine with certainty that the data chunks are not the same, and thus may store the new data chunk in a private data store. Thus, in such circumstances a bit-by-bit comparison of the data chunks may be avoided. The comparison of the two second portions may take much less time and processing resources than comparing the data chunks to one another, and therefore the second approach may handle these collision cases much more efficiently than the first approach.

If the two second portions are the same, then the storage system may know that it is very likely that the new data chunk and the previously stored data chunk are the same. How the storage system handles these collision cases may depend on whether the storage location that is addressed by the first portion of the signature stores a hint or a regular entry. A regular entry differs from a hint in that a regular entry includes a pointer to a storage location in the deduplication data store rather than a back-pointer to a virtual volume.

If the entry is a hint, then this indicates that the previously encountered data with the same first portion as the new data is stored in a private data store. In such cases (the two second portions are the same and the entry is a hint), certain example storage systems may temporarily assume that the new data chunk is duplicate data, and therefore may store the new data chunk in the deduplication data store and change the hint to a regular entry pointing to the new data's storage location. Other example storage systems may instead, in such circumstances, compare the new data and the previously encountered data to be absolutely certain whether they are the same. If the data are not the same, then the new data may be stored in a private data store. If the data are the same, then the new data is duplicative of the previously encountered data already and thus the new data may be stored in the deduplication data store and the hint may be changed to a regular entry pointing to the new data's storage location.

If the entry is a regular entry, then this indicates that the previously encountered data with the same first portion as the new data is already stored in the deduplication data store. In such cases (the two second portions are the same and the entry is a regular entry), example storage systems may compare the new data and the previously encountered data to determine whether they are the same. If the data are not the same, then the new data may be stored in a private data store and the previously stored data may remain unchanged in the deduplication data store. If the data are the same, then the new data is duplicative of the data already stored in the deduplication data store, and thus does not need to be stored again anywhere.

Thus, although the second approach to resolving collisions may occasionally result in performing a comparisons of data chunks, in many cases such a data chunk comparison may be avoided. In particular, as illustrated in Table 1 below, under the first approach a data chunk comparison is performed wherever there is a collision, while under one example implementation of the second approach a data chunk comparison is performed merely for those collisions for which the entry is a regular entry and the second portions of the signatures are the same, which is a small subset of all collisions. Thus, the second approach may result in comparing data chunks much less frequently than the first approach, resulting in much improved efficiency.

TABLE 1

| | Valid Entry at Address (collision) | | | | |
|---|---|---|---|---|---|
| | entry is hint | | entry is regular entry | | No Valid |
| | $2^{nd}$ portions same | $2^{nd}$ portions different | $2^{nd}$ portions same | $2^{nd}$ portions different | Entry at Address (no collision) |
| $1^{st}$ Approach | data comparison performed | | | | input data is singleton |
| $2^{nd}$ Approach | input data is duplicate | input data is singleton | data comparison performed | input data is singleton | input data is singleton |

It may be noted that the efficiency of the first approach may be improved by increasing the size of the first portion of the signatures, since increasing the size of the first portion results in more possible addresses and therefore less likelihood of a collision occurring. However, in certain circumstances such an approach can quickly result in the size of the metadata storage becoming prohibitively large. For example, merely changing the size of the first portion from 32 bits to 33 bits adds almost 4.3 billion new addresses to the metadata storage. Attempting to increase the number of bits in the first portion from 32 bits to 64 bits would result in $1.8 \times 10^{19}$ additional storage addresses being needed. In contrast, the second approach results in improved efficiency relative to the first approach without requiring prohibitively large amounts of storage space for the metadata storage in the deduplication data store. In particular, although adding the second portion of the signature to each entry in the metadata storage locations may increase the size of the metadata storage, the increase in size is orders of magnitude smaller than the increase that would result from attempting to improve the efficiency of the first approach by a comparable amount via other methods (such as by increasing the size of first portion of the signature). For example, if 32 bits are used for the first portion and 64 bits are used for the second portion, the metadata storage under the second approach would be about 34.4 GB larger than the metadata storage under the first approach using the same size of first portion. This increase in size under the second approach is relatively modest when compared to the increase in size that would result from attempting to achieve similar levels of efficiency via other methods, such as by increasing the length of the first portion of the signature, which in some cases may increase the size of the metadata storage on the order of Exabytes.

[Example Storage System]

FIG. 1 illustrates an example storage system 10. The storage system 10 may include a communications interface 20, a storage controller 30, processing circuitry 40, a memory 50 that may store deduplication instructions 504, and storage media 60.

The communications interface 20 may provide an interface for communicating with devices, such as client devices (not illustrated). For example, the communications interface 20 may include a network interface controller. For example, devices may communicate with the communications interface 20 via a network 80, which may include a number of network devices (e.g., switches, routers, etc.). For example, the communications interface 20 may include a number of physical ports (not illustrated) to which communication cables may be connected, receiving/transmitting circuitry (not illustrated) to receive messages from and transmit messages to the physical ports, and control circuitry (not illustrated) to control operations of the communications interface 20. In certain examples, a client device may interact with a file server (not illustrated), and the file server may then communicate with the storage system 10 via the communications interface 20 based on the client device's instructions (e.g., the storage system 10 may be part of a network attached storage (NAS) system). In other examples a client device may communicate with the storage system 10 via the communications interface 20 without relying on an intervening file server (e.g., the storage system 10 may be part of a storage area network (SAN)).

The storage controller 30 may be formed by processing circuitry 40, which may include a number of processors and/or dedicated hardware. For example, portions (or all) of the storage controller 30 may be formed by a number of processors executing machine-readable instructions that cause the processors to perform certain operations described herein. For example, the storage controller 30 may be formed in part by a number of processors executing the deduplication instructions 504, which are described below in relation to FIG. 5. As another example, the storage controller 30 may be formed in part by a number of processors executing the storage controller instructions 30, which are described below in relation to FIG. 5. As another example, portions (or all) of the storage controller 30 may be formed by dedicated hardware that is designed to perform certain operations described herein. In this context, "processors" refers to any circuitry capable of executing machine-readable instructions, such as a central processing unit (CPU), a microprocessor, a microcontroller device, a digital signal processor (DSP), etc. In this context, "dedicated hardware" may include application-specific integrated circuits (ASICs), complex programmable logic devices (CPLDs), field-programmable gate arrays (FPGAs), application-specific instruction set processors (ASIP), etc.

In examples in which the processing circuitry includes processors that are to execute machine-readable instructions, the machine-readable instructions may be stored in the memory 50. For example, the deduplication instructions 504 may be stored in the memory 50. The memory 50 may be any non-transitory machine readable medium, which may include volatile storage media (e.g., DRAM, SRAM, etc.) and/or non-volatile storage media (e.g., PROM, EPROM, EEPROM, NVRAM, flash, hard drives, optical disks, etc.). For example, the memory 50 may corresponds to the non-transitory machine readable medium 500.

The storage controller 30 may be to control reading and writing of data to the storage media 60 based on messages received via the communications interface 20. For example, in response to receiving a request to write data, the storage controller 30 may determine physical storage locations in the storage media 60 in which the data should be stored, and may cause the data to be written to those physical storage locations. As another example, in response to receiving a request to read stored data, the storage controller 30 may determine which physical storage locations in the storage media 60 store the requested data, and cause the data in those physical storage locations to be read.

In certain examples, a single instance of the storage controller 30 may be included in the storage system 10, while in other examples multiple instances of the storage controller 30 may be included in the storage system 10. In certain examples, each storage controller 30 may be to control a single drive; for example, the storage controller may be a disk controller. In certain examples, each storage controller 30 may be to control multiple distinct drives; for example, the storage controller may be an array controller. In certain examples, the storage controller 30 and the storage media 60 may be packaged together as a single storage module or device. In certain examples, the storage controller 30 and the storage media 60 may be included in separate modules or devices; for example, the storage controller 30 may be included in a server while the storage media 60 is included in a separate storage array that is connected to the server. In certain examples, the storage controller 30 may directly control the storage media 60, while in other examples the storage controller 30 may control the storage media 60 indirectly by issuing commands (or requests) to another controller that directly controls the storage media 60.

The storage media 60 may include non-volatile storage media such as solid-state storage media (e.g., flash media), magnetic storage media (such as that found in hard disk drives, tape drives, etc.), NVRAM, etc. The storage media 60 may include a single physical storage medium or multiple physical storage media. Descriptions herein will describe the storage media 60 as if it includes multiple physical storage media, but this is merely for convenience of description and should not be interpreted to exclude the possibility of the storage media 60 including a single storage medium. In certain examples, each physical storage medium making up the storage media 60 may be a same type of storage medium (e.g., all flash media), but in other examples physical storage media of different types may be mixed to form the storage media 60 (e.g., some flash media and some magnetic media). The storage media 60 may include physical storage locations at which data may be stored, and the storage controller 30 may control the storage media 60 to write to and/or read from the physical storage locations.

[Example Storage Controller Details]

The storage controller 30 may use storage virtualization techniques to abstract the physical location of data stored in the storage media 60. For example, the storage controller 30 may form various levels of virtualization that may each include a number of virtual (aka logical) storage spaces, with each virtual storage space mapping to either another virtual storage space or to the storage media 60. For example, the storage controller 30 may make a virtual storage space visible to a user as a space in which the user may store data, but when a user requests to write data to a particular storage location (address) in the virtual storage space, the storage controller 30 may redirect the I/O request to a physical storage location (e.g., bit storage cells) in the storage media 60 at which the data will be stored. Similarly, for example, when a user requests to read data from a particular storage location (address) in the virtual storage space, the storage controller 30 may redirect the I/O request to the physical storage location at which the data is stored. Examples of virtual storage spaces that may be used in storage virtualization schemes include virtual (logical) volumes, private data stores, deduplication data stores, virtual (logical) disks, etc.

In certain examples, the storage controller 30 may form multiple levels of virtualization, in which case a virtual storage space of one level may map to another virtual storage space of another level rather than mapping directly to the storage media 60. From the perspective of one level of virtualization, the next lower level of virtualization may be treated as if it were the physical storage. In addition, a given virtual storage space of one level of virtualization may map to multiple distinct virtual storage spaces of a next level of virtualization (or to multiple distinct physical storage media). For example, data written to the given virtual storage space may be stored in both of the next-level virtual storage spaces (or distinct physical storage media), for example to provide redundancy. As another example, different chunks of data written to the given virtual storage space may be mapped to different next-level virtual storage spaces (or different physical storage media) depending on the characteristics of the data—for example, duplicate data may be mapped to one virtual storage space while singleton data may be mapped to another virtual storage space. In certain examples, virtual storage spaces from a highest level of virtualization may be made visible to a user (client device), and virtual storage spaces from lower levels of virtualization might not be visible to the user. The structure of data as input to a given level of virtualization is not necessarily identical to the structure of the data as stored in the next level of virtualization or in the storage media 60. For example, certain virtualization layers may provide functionalities such as encoding data, interleaving data, striping data, implementing RAID levels, and so forth, which might alter the structure of the data. Each virtual storage space may maintain metadata, which may be used to, among other things, keep track of mappings between its storage locations and storage locations of a next level of virtualization (or storage locations of the storage media 60).

Figure 2:
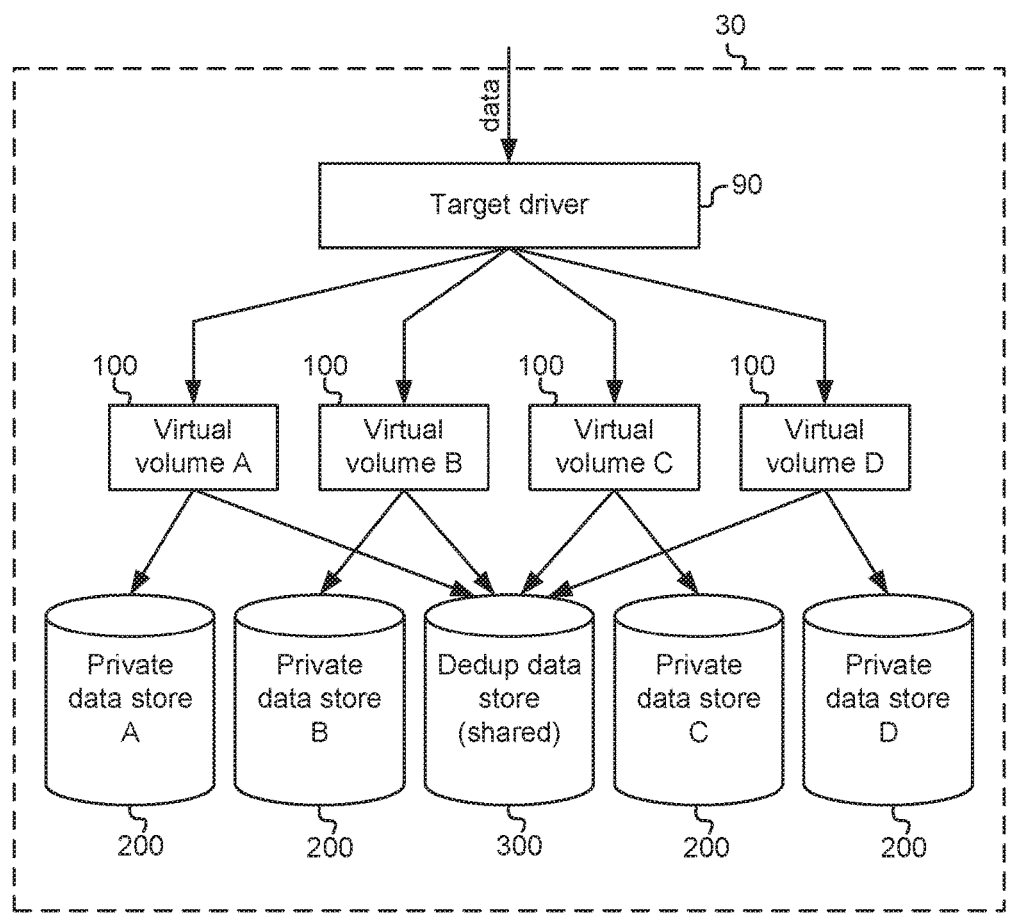
FIG. 2 illustrates an example storage controller that includes an example target driver, example virtual volumes, example private data stores, and an example deduplication data store.

For example, as illustrated in FIG. 2, the storage controller 30 may include a target driver 90, a number of virtual volumes 100, a number of private data stores 200, and a deduplication data store (hereinafter "dedup data store") 300. The target driver 90 may receive messages, such as I/O requests, as well as data that is to be stored from the network interface 20 and direct those messages/data to the virtual volumes 100 to which the messages are addressed. The virtual volumes 100 may be virtual storage spaces that are visible to users (client devices). The private data stores 200 may be virtual storage spaces that are in a lower level of virtualization than the virtual volumes 100. Each private data store 200 may correspond to one of the virtual volumes 100 and may store data from its corresponding virtual volume 100. The private data stores 200 are intended to store singleton data from their corresponding virtual volume 100, where singleton data means data that is stored by just one virtual volume 100 (i.e., no identical copy is stored in another one of the virtual volumes 100). The dedup data store 300 may be a virtual storage space that is in a lower level of virtualization than the virtual volumes 100 and that is shared by all of the virtual volumes 100—that is, the dedup data store 300 may store data from any one of the virtual volumes 100. The dedup data store 300 is intended to store duplicate data, meaning data that has been (or is being) stored in multiple virtual volumes 100. Thus, in general, the virtual volumes 100 each send their singleton data to their own corresponding private data store 200 and send their duplicate data to the shared dedup data store 300.

Although the private data stores 200 are intended to store singleton data and the dedup data store 300 is intended to store duplicate data, it is possible for a private data store 200 to store duplicate data (mistakenly assuming it is singleton data) and for the dedup data store to store singleton data (mistakenly assuming it is duplicate data). In particular, in certain examples of the storage system 10, certain assumptions may be made about whether data is singleton data or duplicate data, which may occasionally be mistaken. Such assumptions may be made, for example, in order to increase efficiency of the deduplication process.

In certain examples, the private data stores 200 and/or the dedup data store 300 may be in the lowest level of virtualization, and thus may map their respective virtual storage locations directly to physical storage locations in the storage media 60. However, in other examples a number of additional levels of virtualization (not illustrated) may be included between the private data stores 200/dedup data store 300 and the storage media 60.

As noted above, the virtual volumes 100, the private data stores 200, and the dedup data store 300 are all virtual entities. Thus, when it is said that data is "stored" in or "written" to one of these entities, this does not mean that the data is physically stored in the entity—ultimately, the data is physically stored in the storage media 60. Instead, when it is said that a virtual storage space "stores" data, this means that the virtual storage space stores a pointer to a storage location in a next lower level of virtualization that stores the data; such a pointer may be stored, for example, in a metadata table, metadata index, or other data structure associated with the virtual storage space. Thus, for example, the private data store 200-A in FIG. 2 may store a given chunk of data by storing a pointer to a physical storage location in the storage media 60 at which the given chunk of data is stored (or a pointer to a storage location in a next lower level of virtualization if there is one).

When a chunk of data is received by the storage system 10 for storage, the storage controller 30 may generate a signature for the data for purposes of deduplication. For example, a hash function, such as SHA-256 for example, may be applied to the chunk of data, and the value output by the hash function may be used as the signature. The signature may have a specific number of bits—for example, if SHA-256 is used to generate the signature, then the signature will have 256 bits.

Various portions of the signature of each data chunk may be used by the storage controller 30 for different purposes. In particular, the storage controller 30 may identify a first portion and a second portion of each signature, where the first portion of each signature may comprise a group of B contiguous bits in the signature starting at a specified bit b, and the second portion of each signature may comprise a group of C contiguous bits in the signature starting at a specified bit c, where B, C, b, and c are integers. For example, the first portion of each signature may be the first 32 bits of the signature (i.e., B=32 and b=1), and the second portion of each signature may be the next 64 bits after the first portion (i.e., C=64, c=33).

The storage controller 30 may use a first portion of each signature to address a storage location in the dedup data store 300 for the corresponding data chunk. In other words, if an entry is stored in the dedup data store 300 for a given data chunk, it is stored in the storage location whose address corresponds to the first portion of the signature of the given data chunk. Thus, for example, if the first portion of the signature of data chunk DATA1 is "00101101", then the entry for DATA1 in the dedup store 300 will be stored at the storage location whose address is "00101101". In order for each possible first portion to be able to address a distinct storage location in the dedup data store 300, the dedup data store 300 may need to include at least $2^B$ storage locations.

Figure 3:
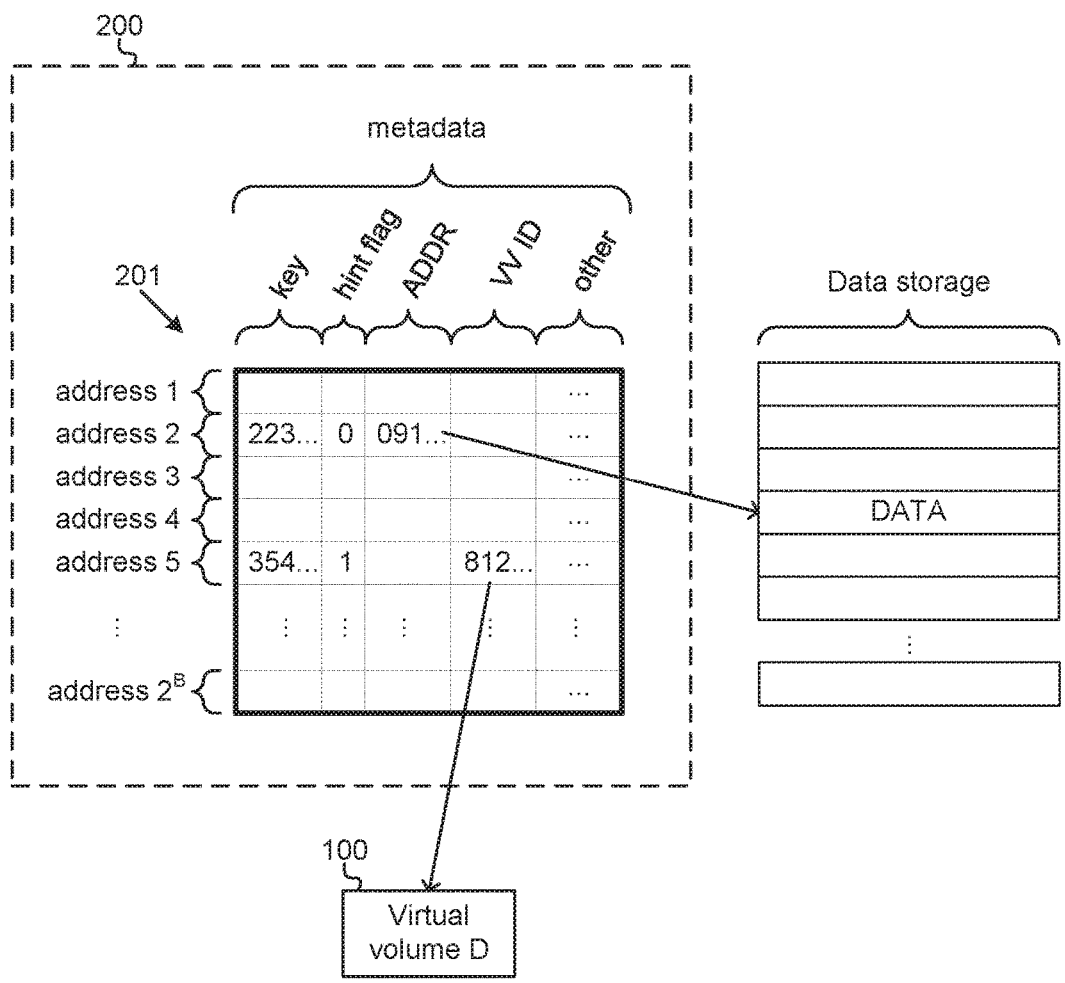
FIG. 3 illustrates an example metadata storage table of an example deduplication data store.

In certain examples, the storage locations in the dedup data store 300 that are addressed by the first portions of the signatures may be entries of a metadata table 201, as illustrated in FIG. 3. Such a metadata table 201 may include $2^B$ entries, and each entry may be a storage location of the dedup data store 300 that may be used to store metadata for a corresponding data chunk. As illustrated in FIG. 3, each entry may include a key, a hint flag, a pointer to a storage location for the data chunk (ADDR), and a back-pointer to one of the virtual volumes 200 (VV ID). Each entry may also include additional metadata (not illustrated) related to the corresponding data chunk. When an entry is populated for a given storage chunk, the storage controller 30 may store the second portion of the signature for the given storage chunk as the key of the entry.

The metadata storage locations that store valid metadata may store either a hint or a regular entry. A hint is an entry that includes a back-pointer to one of the virtual volumes 200 and does not includes a pointer to a storage location for the data chunk. A back-pointer to a virtual volume 200 may include identification information for the virtual volume and/or an address within the virtual volume (such as a page address). For example, in FIG. 3 the metadata storage location at address 5 stores a hint, which includes a pointer (VV ID) to the virtual volume 100-D that stores the corresponding data, as well as the second portion of the signature of the corresponding data (key). A regular entry includes a pointer to a storage location for the data chunk and does not include a back-pointer to one of the virtual volumes 200. For example, in FIG. 3 the metadata storage location at address 2 stores a regular entry, which includes a pointer (ADDR) to a storage location that stores the data chunk labeled "DATA", as well as the second portion of the signature of DATA (key). In certain examples in which the hint flag is included in the entries, the hint flag may be set to indicate that the entry is a hint and reset to indicate that the entry is a regular entry.

A metadata storage location stores a "valid" entry if it is not empty and if its metadata has not been invalidated, while it stores an "invalid" entry if it is empty or if the metadata stored therein has been invalidated. For example, an entry may have its metadata invalidated when the corresponding data has been deleted from the storage system 10. In certain examples, the entries may each include a flag that may be used to mark valid and invalid entries. In other examples, any entry that is not empty may be determined to be valid.

[Example Deduplication Processing]

Figure 4:
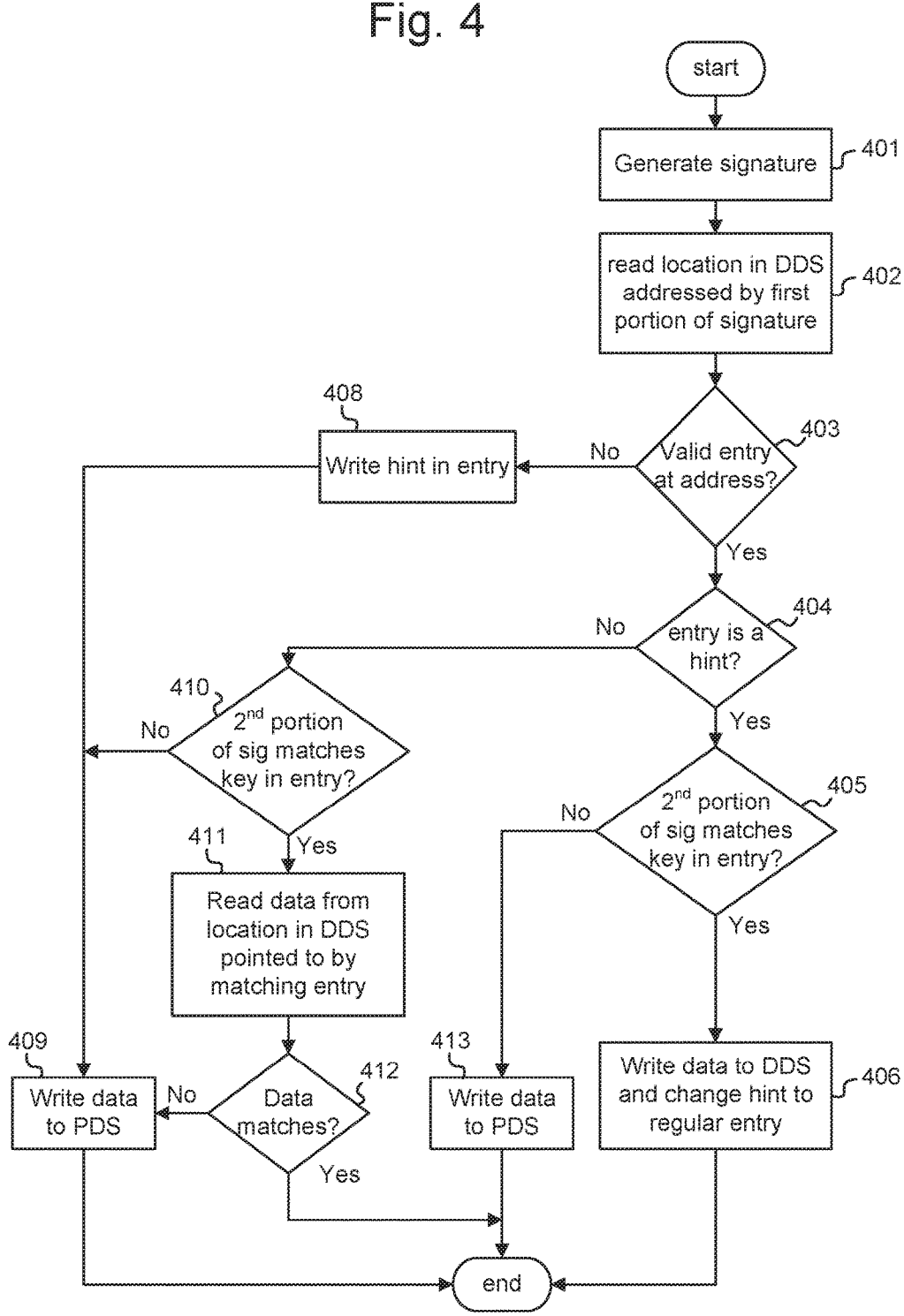
FIG. 4 illustrates an example deduplication process.

In response to receiving a data chunk that is to be stored in one of the virtual volumes 100, the storage controller 30 may perform the process illustrated in FIG. 4. For example, in the explanation below the data chunk that is to be stored may be referred to as DATA1, and it will be assumed for the sake of illustration that DATA1 was sent to the virtual volume 100-A to be stored therein.

In block 401, a signature is generated for the data chunk DATA1. For example, the signature may be generated by applying a hash function to DATA1. In the explanation below the signature for DATA1 may be referred to as S1, the first portion of the signature S1 may be referred to as P1_S1, and the second portion of the signature S1 may be referred to as P2_S1.

In block 402, the metadata storage location in the dedup data store (DDS) 300 that is addressed by the first portion of the signature is read. That is, the location whose address corresponds to P1_S1 is read.

In block 403, it is determined whether a valid entry is stored at the location addressed by the first portion of the signature. In this context, a "valid" entry is an entry that is not empty and whose stored metadata has not been invalidated, while an invalid entry is an empty entry or an entry whose stored metadata has been invalidated. For example, an entry may have its metadata invalidated when the corresponding data has been deleted from the storage system 10. In certain examples, the entries may each include a flag that may be used to mark valid and invalid entries. In other examples, any non-empty entry may be determined to be valid.

If the determination in block 403 is negative (i.e., the entry in invalid), then this means that no other data whose signature's first portion matches P1_S1 has been encountered yet. Thus, it may be inferred that DATA1 is not duplicate data, and therefor the data chunk DATA1 may be stored in the private data store 200 that is associated with the virtual volume 100 to which the data chunk DATA1 was written (i.e., the private data store 200-A). Thus, the process may proceed to blocks 408 and 409.

In block 408 a hint is written into the entry that is addressed by the first portion of the signature (P1_S1). In particular, writing a hint to the entry may include writing the second portion of the signature (P2_S1) as the key of the entry, and writing a back-pointer to the virtual volume 100 that received the input data (i.e., the virtual volume 100-A). In certain examples, the entries may also include hint flags, in which case the hint flag of the entry may be set to indicate that the entry is a hint.

In block 409, the data chunk DATA1 is written to (stored in) the private data store 200 that is associated with the virtual volume 100 that received the data chunk DATA1, i.e., the data store 200-A.

If the determination in block 403 is positive (i.e., the entry is valid), then this means that some other data (call it DATA0) has already been processed whose first portion equals the first portion of DATA1. In other words, it can be inferred that the data chunk DATA1 is not the first data chunk stored by the storage system that has the value P1_S1 as the first portion of their signature. However, since it is possible for two different chunks of data to have signatures whose first portion is the same, additional information may be needed to determine whether or not the DATA1 is duplicate data or singleton data. Thus, in this case the process proceeds to block 404 for further analysis.

In block 404, it is determined whether the entry stored at the location addressed by P1_S1 is a hint. A hint includes a back-pointer to a virtual volume 100 rather than a pointer to a data storage location. In certain examples, the entries include hint flags and thus it may be determined whether the entry is a hint based on the status of the hint flag. In certain other examples, the hint flag may be omitted and it may be inferred that the entry is a hint from the fact that a back-pointer to a virtual volume 100 is included in the entry and/or from the fact that a pointer to a data storage location is not included in the entry.

If the determination in block 404 is negative (i.e., the entry is not a hint), then this means that the previously encountered data DATA0 is stored in the dedup data store 300. Thus, if DATA1 is the same as DATA0, then DATA1 does not need to be written again (since DATA0 is already stored), while if DATA1 is different from DATA0, then DATA1 will may be written in a private data store 200. Thus, the process proceeds to blocks 410-412 in which it is determined whether DATA0 and DATA1 are identical.

In block 410, it is determined whether the second portion of the signature (P2_S1) of the data chunk DATA1 matches the key that is stored in the entry.

If the determination in block 410 is negative (i.e., P2_S1 and the key do not match), then this means that the previously encountered data DATA0, whose first portion was equal to P1_S1, is actually different from DATA1—i.e., DATA1≠DATA0. In particular, the key stored in the entry is the second portion of the previously encountered data DATA0, and therefore the fact that the key does not match P2_S1 means that the signature of DATA0 is not identical to the signature S1 of DATA1. Because in this case DATA1 is different from DATA0, DATA1 may be safely stored in the private data store 200-A, and therefore the process proceeds to block 409.

If the determination in block 410 is positive (i.e., P2_S1 and the key match), then this means that it is very likely that DATA0 and DATA1 are the same data. In particular, the first and second portions of their signatures match, which would be highly unlikely for two different pieces of data. However, at this stage we cannot know for certain that DATA0 is identical to DATA1 without comparing the actual data. Thus, the process proceeds to block 411.

In block 411, the data that is pointed to by the entry (in this example, DATA0) is read. The process then proceeds to block 412.

In block 412, it is determined whether the read data (DATA0) matches the data to be written (DATA1).

If the determination in block 412 is negative (DATA0≠DATA1), then DATA1 may be stored in a private data store 200, and therefor the process proceeds to block 409.

If the determination in block 412 is positive (DATA1=DATA0), then this means that DATA1 is duplicate data that is already stored in the dedup data store 300. Since DATA1 is already stored in the dedup data store 300 (as DATA0), there is no need to perform store DATA1 again.

If the determination in block 404 is positive (i.e., the entry is a hint), then this means that the previously encountered data DATA0 is stored in one of the private data stores 200. The process then proceeds to block 405.

In block 405, it is determined whether the second portion of the signature (P2_S1) of the data chunk DATA1 matches the key that is stored in the entry.

If the determination in block 405 is negative (i.e., P2_S1 and the key do not match), then this means that the previously encountered data DATA0, whose first portion was equal to P1_S1, is actually different from DATA1—i.e., DATA1≠DATA0. Because in this case DATA1 is different from DATA0, DATA1 may be stored in the private data store 200-A, and thus the process may proceed to block 413.

In block 413 the data chunk DATA1 is written to (stored in) the private data store 200 that is associated with the virtual volume 100 that received the data chunk DATA1, i.e., the data store 200-A. If block 413 is reached, then both the previously received data DATA0 and the present data chunk DATA1 are stored in a private data store 200, and therefore a hint could be stored in the dedup data store 300 for either one of these data chunks. In general, one hint at a time may be stored per metadata storage location. Thus, in certain examples the existing hint in the location addressed by P1_S1, which corresponds to DATA0, may be retained. In certain other examples, a new hint corresponding to DATA1 may be written in the location addressed by P1_S1, thereby overwriting the previously stored hint corresponding to DATA0. The new hint corresponds to DATA1, and may include P2_S1 as the key and a back-pointer to the virtual volume 100-A.

If the determination in block 405 is positive (i.e., P2_S1 and the key match), then this means that it is very likely that DATA0 and DATA1 are the same data. In particular, the first and second portions of their signatures match, which would be highly unlikely for two different pieces of data. Although it cannot be known for certain at this stage that DATA0 is identical to DATA1, in certain examples the storage controller 30 assumes at this stage that DATA1 is duplicate data of DATA0 and therefor stores DATA1 in the dedup data store 300. Thus, the process proceeds to block 406.

In block 406, DATA1 is stored in the DDS and the entry addressed by P1 S1 is changed from a hint to a regular entry by adding a pointer to the storage location of DATA1. If there is a hint flag, the flag may be reset. In addition, the virtual volume 100 that is pointed to by the back-pointer of the previously stored hint may be notified of the possibility that DATA0 is duplicate data, and the back-pointer to the virtual volume 100 that stores DATA0 may be deleted. The virtual volume 100 that stores DATA0 may then initiate a separate deduplication process for determining whether DATA0 is duplicate data and hence should be deleted.

[Signature Generation]

As noted above, a signature for a data chunk may be generated by applying a hash function to the data chunk. The hash function may be applied to the entire data chunk, or to portions of the data chunk. The hash function may also be applied multiple times to different portions of the data chunk to obtain multiple different hash values, and those hash values collectively may form the signature of the data chunk.

Specifically, the "signature" of a data chunk may comprise either a single hash value generated based on the data chunk, or a collection of distinct hash values that are generated based on the data chunk. In certain examples, a collection of hash values forming a signature of a data chunk may be explicitly concatenated together into a single value. In other examples, a collection of hash values forming a signature of a data chunk is not explicitly concatenated together into a single value. Any hash value (or combination of hash values) that is generated from a given data chunk—or any portion thereof—may be a "portion" of the signature of the data chunk, regardless of whether the signature is concatenated into a single value or remains a collection of separate values.

Forming a signature for a data chunk from multiple hash values (rather than from a single hash value) may be useful, for example, when the hash function that is used generates a hash value whose length is smaller than is desired for the signature. In such examples, a signature of the desired length may be generated by generating multiple smaller hash values based on the data chunk, the multiple hash values collectively forming the signature. As noted above, the distinct hash values forming the signature may be generated by applying the hash function to different portions of the data chunk. Any portions of the data chunk may be used for generating hash values, and any number of hash values may be combined.

For example, a first hash value may be generated by applying the hash function to the entire data chunk, a second hash value may be generated by applying the hash function to the first half of the data chunk, and a third hash value may be generated by applying the hash function to the second half of the data chunk. The signature for the data chunk may then comprise the collection of the first, second, and third hash values. For example, the "first portion" of such a signature may be the first hash value and the "second portion" of the signature may be the second and third hash values concatenated together.

Each example storage system described herein may use any of the forgoing techniques to generate a signature, unless specifically indicated otherwise. Similarly, any process described herein that includes an operation of generating a signature may perform that operation according to any of the forgoing techniques.

[Example Machine Readable Medium]

Figure 5:
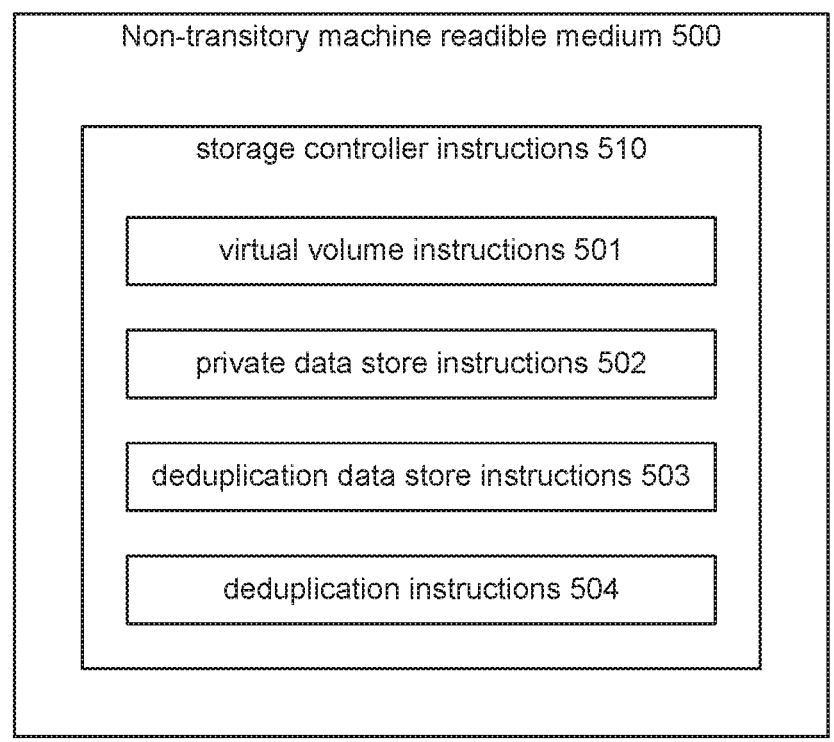
FIG. 5 illustrates an example non-transitory machine readable medium storing machine readable instructions.

FIG. 5 illustrates an example non-transitory machine readable medium 500. The non-transitory machine readable medium 500 may be any non-transitory machine readable medium, which may include volatile storage media (e.g., DRAM, SRAM, etc.) and/or non-volatile storage media (e.g., PROM, EPROM, EEPROM, NVRAM, flash, hard drives, optical disks, etc. The example non-transitory machine readable medium 500 stores machine readable instructions, including storage controller instructions 510.

The storage controller instructions 510 may be instructions that, when executed by processing circuitry (such as the processing circuitry 40), form the storage controller 30 described above (in whole, or in part). That is, the storage controller instructions 510 may include instructions to perform any of the operations described above in relation to the storage controller 30. For example, the storage controller instructions 510 may include virtual volume instructions 501, private data store instructions 502, deduplication data store instructions 503, and deduplication instructions 504.

The virtual volume instructions 501 may include instructions to form the virtual volumes 100 described above. The private data store instructions 502 may include instructions to form the private data stores 200 described above. The deduplication data store instructions 503 may include instructions to form the deduplication data store described above. The deduplication instructions 504 may include instructions to perform the operations described above in relation to the deduplication process.

In certain examples, the deduplication instructions 504 may include instructions to, for input data that is to be stored in one of the virtual volumes: determine a signature for the input data; read a metadata storage location that is addressed by a first portion of the signature; if the metadata storage location does not include valid metadata, store a second portion of the signature and a back-pointer to the virtual volume in the metadata storage location and store the input data in the private data store associated with the virtual volume; and if the entry includes valid metadata, determine whether to store the input data in the private data store associated with the virtual volume or in the deduplication data store based on: whether the metadata includes a back-pointer to one of the virtual volumes, and whether a second portion of the signature matches a key included in the metadata. In certain examples, the deduplication instructions 504 may include instructions to perform the process illustrated in FIG. 4 and described above.

Throughout this disclosure and in the appended claims, occasionally reference may be made to "a number" of items. Such references to "a number" mean any integer greater than or equal to one. When "a number" is used in this way, the word describing the item(s) may be written in pluralized form for grammatical consistency, but this does not necessarily mean that multiple items are being referred to. Thus, for example, a phrase such as "a number of processors, wherein the processors . . . " could encompass both one processor and multiple processors, notwithstanding the use of the pluralized form.

The fact that the phrase "a number" may be used in referring to some items should not be interpreted to mean that omission of the phrase "a number" when referring to another item means that the item is necessarily singular or necessarily plural.

In particular, when items are referred to using the articles "a", "an", and "the" without any explicit indication of singularity or multiplicity, this should be understood to mean that there is "at least one" of the item, unless explicitly stated otherwise. When these articles are used in this way, the word describing the item(s) may be written in singular form for grammatical consistency, but this does not necessarily mean that only one items is being referred to. Thus, for example, a phrase such as "a processor, wherein the processor . . . " could encompass both one processor and multiple processors, notwithstanding the use of the singular form.

Occasionally the phrase "and/or" is used herein in conjunction with a list of items. This phrase means that any combination of items in the list—from a single item to all of the items and any permutation in between—may be included. Thus, for example, "A, B, and/or C" may include {A}, {B}, {C}, {A, B}, {A, C}, {C, B}, and {A, C, B}.

While the above disclosure has been shown and described with reference to the foregoing examples, it should be understood that other forms, details, and implementations may be made without departing from the spirit and scope of this disclosure.

What is claimed is:

1. A storage system comprising:
    storage media;
    processing circuitry; and
    non-transitory machine-readable media storing machine-readable instructions that, when executed by the processing circuitry, cause the processing circuitry to:
        establish virtual volumes, private data stores, and a deduplication data store, each being a virtual storage space of the storage media, wherein each of the private data stores is associated with one of the virtual volumes and the deduplication data store is shared among the virtual volumes;
        in response to receiving input data that is to be stored in a given virtual volume of the virtual volumes, determine a signature for the input data and:
            if a metadata storage location addressed by a first portion of the signature includes valid metadata, select where to store the input data based on:
                whether the metadata includes a back-pointer to one of the virtual volumes, and
                whether a second portion of the signature matches a key included in the metadata; and
            if the metadata storage location does not include valid metadata,
                store the second portion of the signature and a back-pointer to the given virtual volume in the metadata storage location, and
                store the input data in the private data store associated with the given virtual volume.

2. The storage system of claim 1, wherein the machine-readable instructions, when executed, further cause the processing circuitry to:
    if the metadata storage location addressed by the first portion of the signature includes valid metadata and if the second portion of the signature does not match the key included in the metadata, store the input data in the private data store associated with the given virtual volume.

3. The storage system of claim 1, wherein the machine-readable instructions, when executed, further cause the processing circuitry to:
    if the metadata storage location addressed by the first portion of the signature includes valid metadata, if the second portion of the signature matches the key included in the metadata, and if the metadata includes a back-pointer to one of the virtual volumes, store the input data in the deduplication data store.

4. The storage system of claim 1, wherein the machine-readable instructions, when executed, further cause the processing circuitry to:
    if the metadata storage location addressed by the first portion of the signature includes valid metadata, if the second portion of the signature matches the key included in the metadata, and if the metadata includes a pointer to a storage location in the deduplication data store: compare the input data to data stored in the storage location pointed to by the pointer.

5. The storage system of claim 4, wherein the machine-readable instructions, when executed, further cause the processing circuitry to:
    if the input data matches the data stored in the storage location pointed to by the pointer: refrain from storing the input data and instruct the virtual volume to reference the storage location in the deduplication data store.

6. The storage system of claim 4, wherein the machine-readable instructions, when executed, further cause the processing circuitry to:
    if the input data does not match the data stored in the storage location pointed to by the pointer: store the input data in the private data store associated with the virtual volume.

7. The storage system of claim 1, wherein the machine-readable instructions, when executed, further cause the processing circuitry to:
    in determining the signature for the input data, apply a hash function to a first portion of the input data to obtain a first hash and apply the hash function to a second portion of the input data to obtain a second hash,
    wherein the signature comprises the combination of the first hash and the second hash.

8. Non-transitory machine-readable media storing machine-readable instructions that, when executed by processing circuitry of a storage system, cause the processing circuitry to:
- establish virtual volumes, private data stores, and a deduplication data store, each being a virtual storage space of storage media of the storage system, wherein each of the private data stores is associated with one of the virtual volumes and the deduplication data store is shared among the virtual volumes; and
- for input data that is to be stored in one of the virtual volumes:
  - determine a signature for the input data;
  - read a metadata storage location that is addressed by a first portion of the signature;
  - when the metadata storage location does not include valid metadata, store a second portion of the signature and a back-pointer to the virtual volume in the metadata storage location and store the input data in the private data store associated with the virtual volume; and
  - when the entry includes valid metadata, determine whether to store the input data in the private data store associated with the virtual volume or in the deduplication data store based on: whether the metadata includes a back-pointer to one of the virtual volumes, and whether a second portion of the signature matches a key included in the metadata.

9. The non-transitory machine-readable media of claim 8, wherein the machine-readable instructions, when executed, further cause the processing circuitry to:
- when the metadata storage location includes valid metadata and when the second portion of the signature does not match the key included in the metadata, store the input data in the private data store associated with the virtual volume.

10. The non-transitory machine-readable media of claim 8, wherein the machine-readable instructions, when executed, further cause the processing circuitry to:
- when the metadata storage location includes valid metadata, when the second portion of the signature matches the key included in the metadata, and when the metadata includes a back-pointer to one of the virtual volumes, store the input data in the deduplication data store.

11. The non-transitory machine-readable media of claim 8, wherein the machine-readable instructions, when executed, further cause the processing circuitry to:
- when the metadata storage location includes valid metadata, when the second portion of the signature matches the key included in the metadata, and when the metadata includes a pointer to a storage location in the deduplication data store: compare the input data to data stored in the storage location pointed to by the pointer.

12. The non-transitory machine-readable media of claim 11, wherein the machine-readable instructions, when executed, further cause the processing circuitry to:
- when the metadata storage location includes valid metadata, when the second portion of the signature matches the key included in the metadata, when the metadata includes a pointer to storage location in the deduplication data store, and when the input data does not match the data stored in the storage location pointed to by the pointer: store the input data in the private data store associated with the virtual volume.

13. The non-transitory machine-readable media of claim 8, wherein the machine-readable instructions, when executed, further cause the processing circuitry to:
- in determining the signature for the input data, apply a hash function to a first portion of the input data to obtain a first hash and apply the hash function to a second portion of the input data to obtain a second hash,
- wherein the signature comprises the combination of the first hash and the second hash.

14. A method of controlling a storage system comprising virtual volumes, private data stores associated respectively with the virtual volumes, and a deduplication data store shared among the virtual volumes, the method comprising:
- determining a signature for input data that is to be written to one of the virtual volumes by applying a hash function to a first portion of the input data to obtain a first hash and applying the hash function to a second portion of the input data to obtain a second hash wherein the signature comprises the combination of the first hash and the second hash;
- determining whether to store the input data in the private data store associated with the virtual volume or in the deduplication data store based on:
  - whether a metadata storage location addressed by a first portion of the signature includes valid metadata, and, when so:
    - whether the metadata includes a back-pointer to one of the virtual volumes, and
    - whether a second portion of the signature matches a key included in the metadata; and
- storing the input data in the private data store associated with the virtual volume or in the deduplication data store.

15. The method of claim 13, further comprising:
- responsive to determining that the metadata storage location addressed by the first portion of the signature does not include valid metadata, storing the second portion of the signature and a back-pointer to the virtual volume in the metadata storage location and storing the input data in the private data store associated with the virtual volume.

16. The method of claim 14, further comprising:
- responsive to determining that the metadata storage location addressed by the first portion of the signature includes valid metadata and that the second portion of the signature does not match the key included in the metadata, storing the input data in the private data store associated with the virtual volume.

17. The method of claim 14, further comprising:
- responsive to determining that the metadata storage location addressed by the first portion of the signature includes valid metadata, that the second portion of the signature matches the key included in the metadata, and that the metadata includes a back-pointer to one of the virtual volumes, storing the input data in the deduplication data store.

18. The method of claim 14, further comprising:
- responsive to determining that the metadata storage location addressed by the first portion of the signature includes valid metadata, that the second portion of the signature matches the key included in the metadata, and that the metadata includes a pointer to storage location in the deduplication data store: comparing the input data to data stored in the storage location pointed to by the pointer and determining whether to store the input data in the private data store associated with the virtual volume or in the deduplication data store based on the comparison.

\* \* \* \* \*